(12) United States Patent
Hinrichs et al.

(10) Patent No.: US 7,118,324 B1
(45) Date of Patent: Oct. 10, 2006

(54) $CO_2$ COMPRESSOR

(75) Inventors: Jan Hinrichs, Friedrichsdorf (DE); Peter Kuhn, Weinheim (DE); Frank Obrist, Dornbirn (AT)

(73) Assignee: LuK Fahrzeug-Hydraulik GmbH & Co. KG, Bad Homburg (DE)

( * ) Notice: Subject to any disclaimer, the term of this patent is extended or adjusted under 35 U.S.C. 154(b) by 463 days.

(21) Appl. No.: 10/048,330

(22) PCT Filed: Aug. 4, 2000

(86) PCT No.: PCT/EP00/07569

§ 371 (c)(1),
(2), (4) Date: Jun. 17, 2002

(87) PCT Pub. No.: WO01/11276

PCT Pub. Date: Feb. 15, 2001

(30) Foreign Application Priority Data

Aug. 6, 1999 (DE) .............................. 199 37 250

(51) Int. Cl.
*F04D 29/06* (2006.01)
*F04D 29/12* (2006.01)

(52) U.S. Cl. .................... 415/113; 415/111; 415/112; 415/180; 415/231; 184/6.16; 184/11.2; 184/13.1; 92/86; 92/153; 92/154; 277/370; 277/373

(58) Field of Classification Search ........ 415/111–113, 415/174.2, 174.3, 180, 230–231; 184/6.16, 184/6.17, 11.1, 11.2, 13.1; 417/269; 92/153–154, 92/71, 86; 277/370, 372–373; 91/499
See application file for complete search history.

(56) References Cited

U.S. PATENT DOCUMENTS

| | | | | |
|---|---|---|---|---|
| 2,825,499 A | * | 3/1958 | Gibson et al. | 417/269 |
| 3,457,873 A | * | 7/1969 | Fischer et al. | 91/499 |
| 3,527,464 A | * | 9/1970 | Goldberg | 277/373 |
| 3,536,333 A | * | 10/1970 | Gits et al. | 277/372 |
| 3,601,012 A | * | 8/1971 | Oram | 91/499 |
| 4,005,948 A | | 2/1977 | Hiraga et al. | |
| 5,562,182 A | * | 10/1996 | Kayukawa et al. | 184/6.17 |
| 5,658,127 A | * | 8/1997 | Bond et al. | 415/112 |
| 5,797,602 A | * | 8/1998 | Less | 277/372 |
| 5,827,041 A | * | 10/1998 | Charhut | 415/112 |
| 6,318,972 B1 | * | 11/2001 | Huang et al. | 417/269 |
| 6,325,599 B1 | * | 12/2001 | Herder et al. | 417/269 |
| 6,328,528 B1 | * | 12/2001 | Dahlheimer | 415/113 |

FOREIGN PATENT DOCUMENTS

| | | |
|---|---|---|
| DE | 196 14 384 C2 | 10/1996 |
| DE | EP-1024319 A2 * | 8/2000 ................. 417/269 |
| GB | 2 139 320 A | 11/1984 |

\* cited by examiner

*Primary Examiner*—Christopher Verdier
(74) *Attorney, Agent, or Firm*—Morriss O'Bryant Compagni, P.C.

(57) ABSTRACT

A $CO_2$ compressor for an air conditioner of a motor vehicle is suggested having a sealing device, assigned to the driveshaft of the $CO_2$ compressor, which is implemented as a sliding ring. The $CO_2$ compressor features a lubrication device, in which the sealing device is supplied a lubricant flow effected by centrifugal forces.

27 Claims, 2 Drawing Sheets

$CO_2$ COMPRESSOR

The present invention relates to a $CO_2$ compressor for an air conditioner of a motor vehicle having a sliding ring seal.

$CO_2$ compressors of the type referred to here are known. It is disadvantageous that high wear frequently appears in the sliding rig seal comprising a sliding ring and a counter ring, which particularly occurs because the sliding ring, which has a spring force applied to it, and the counter ring must be pressed against one another with a relatively high force in order that sufficient pressure is produced in the region of the sealing surface lying between the counter ring and the sliding ring and escape of $CO_2$ may be prevented. As a rule, in a sliding ring seal, the counter ring is implemented as fixed while the sliding ring rotates with the driveshaft of the compressor and has a spring force applied to it. However, embodiments are also known in which the sliding ring is fixed and the counter ring rotates.

The object of the present invention is to provide a $CO_2$ compressor which is distinguished by reduced wear.

To achieve this object, a $CO_2$ compressor is suggested which is characterized in that a lubrication device is provided which generates a lubricant flow. This is produced by centrifugal forces. It is therefore possible in a simple way to ensure lubrication in the region of the sliding ring seal. Costly devices for generating the lubricant flow may particularly be dispensed with.

An exemplary embodiment of the $CO_2$ compressor is preferred which is distinguished by a component, rotating during operation of the $CO_2$ compressor and acting as a centrifugal force pump, which works together with the lubricant in such a way that through the rotation of the component, given during operation of the $CO_2$ compressor, the lubricant is swirled so that centrifugal forces build up a flow which flows outward from the rotational axis of the flange.

During rotation of the component the lubricant is thus displaced outward by the centrifugal forces and swirls and therefore reaches the inner side of the $CO_2$ compressor and/or its housing, so that a liquid ring is built up which displays a slight overpressure dependent on the rotational speed of the component and the quantity of liquid. This overpressure in the liquid ring causes an oil-$CO_2$ mixture to be moved from the outside into the inside of the $CO_2$ compressor via suitable openings, so that a lubricant flow arises which is guided to the sliding ring seal. It is clear that a $CO_2$ compressor of this type has a simple design and is distinguished by effective lubricant flow. This flow may also be guided in such a way that bearing devices of the $CO_2$ compressor are also supplied.

Furthermore, an exemplary embodiment of the $CO_2$ compressor is preferred which is distinguished in that the rotatable component is a flange provided inside the $CO_2$ compressor. This flange is used, for example, to drive a compressor unit of the $CO_2$ compressor and is therefore referred to as a driver flange. The compressor unit may be implemented in a typical way, for example as an axial piston pump. The flange is located inside the $CO_2$ compressor and works together, as described above, with the lubricant so that, through the rotation of the flange given by the operation of the $CO_2$ compressor, a flow acting outward from the rotational axis of the flange is built up by centrifugal forces, with swirls caused by the flange also acting on the lubricant, which additionally contribute to the flow. During rotation of the flange, the liquid ring described is thus built up, which finally causes the lubricant flow.

In addition, an exemplary of the $CO_2$ compressor is preferred which is distinguished in that the sliding ring seal has a driver device which grips the sliding ring rotating with the driveshaft and sets it in rotation. In spite of the high pressures which are necessary in a $CO_2$ compressor, synchronous rotation of the sliding ring with the driveshaft is thus ensured, with no wear arising in the region between the driveshaft and the sliding ring because of this.

An exemplary embodiment of the $CO_2$ compressor is preferred in which the driver device is coupled with the flange driven by the driveshaft of the $CO_2$ compressor so that they rotate together.

Furthermore, an exemplary embodiment of the $CO_2$ compressor is preferred in which the driver device includes a spring device which applies a prestressing force to one tongue of the driver device. A design of this type greatly simplifies the assembly of the sliding ring seal, since the tongue of the driver device catches quasi-automatically, or at latest after one rotation of the driver device. For example, the tongue may engage in a flange which is set in rotation by the driveshaft.

In addition, an exemplary embodiment of the $CO_2$ compressor is preferred in which the driver device has at least one driver arm which works together with the sliding ring.

In addition, an exemplary embodiment of the $CO_2$ compressor is preferred in which the driver device is producible from a flat material, for example from sheet metal.

Furthermore, an exemplary embodiment of a $CO_2$ compressor is preferred in which the driver device is producible in a stamping-bending method, and therefore in a simple, economical way.

In a further preferred exemplary embodiment of the $CO_2$ compressor, the driver device is produced from one piece.

A further preferred exemplary embodiment of the $CO_2$ compressor is characterized in that the sliding ring seal has a fixed counter ring in which is coupled with a housing part of the $CO_2$ compressor and a coupling device which effects the coupling. In this way, a rigid coupling may be implemented between the housing and the counter ring, so that frictional forces between the housing and the counter ring are prevented.

In addition, an exemplary embodiment of the $CO_2$ compressor is preferred which is distinguished in that the coupling device has a dihedron and/or at least one coupling pin.

Furthermore, an exemplary embodiment of the $CO_2$ compressor is preferred which is distinguished in that the sliding ring seal has a sleeve implemented as a housing, which allows the sliding ring seal to be integrated as a completely assembled device in the $CO_2$ compressor.

In addition, an exemplary embodiment of the $CO_2$ compressor is preferred in which a bearing device assigned to the driveshaft is provided, and the bearing device has a bearing positioned outside the $CO_2$ atmosphere which is thus removed from the damaging influences of this medium.

In addition, an exemplary embodiment of the $CO_2$ compressor is preferred which is characterized in that the bearing is sealed and lubricated with grease. The sealing provides additional protection of the bearing and keeps the lubricant from being affected by the $CO_2$.

Furthermore, an exemplary embodiment of the $CO_2$ compressor is preferred in which a relief chamber is provided between the bearing device and the sealing device. This is used for decoupling the bearing from the $CO_2$ atmosphere.

Finally, an exemplary embodiment of the $CO_2$ compressor is preferred in which the relief chamber has a relief channel. This preferably produces a connection between the relief chamber and the atmosphere, so that $CO_2$ which penetrates the relief chamber may escape without anything further and pressure build-up is avoided.

The invention is described more detail in the following with reference to the drawing.

Figure 1:
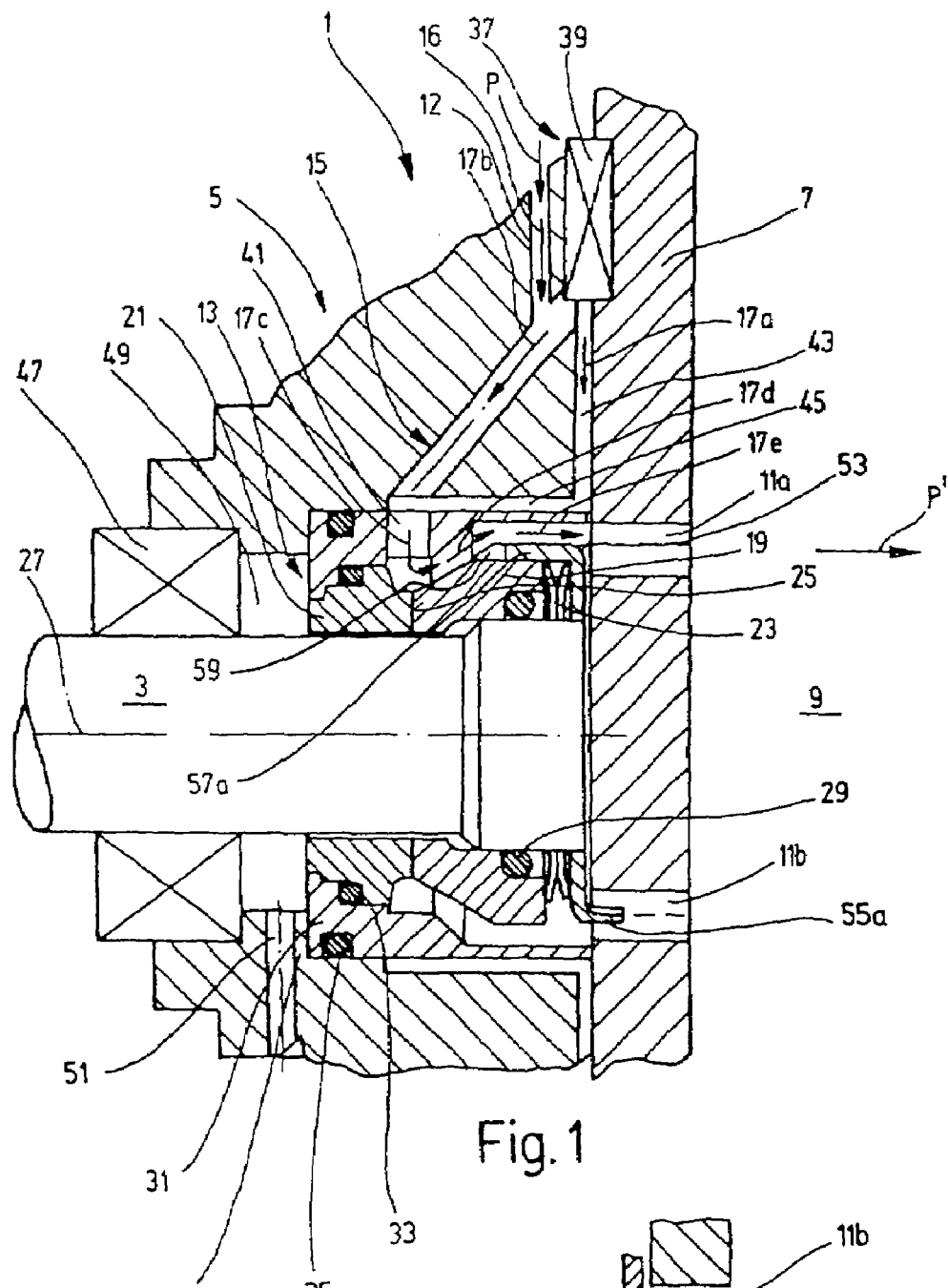
FIG. 1 shows a part of a $CO_2$ compressor in longitudinal section.

The illustration in FIG. 1 shows a part of a $CO_2$ compressor 1 in longitudinal section which is used for an air conditioner of a motor vehicle and includes a driveshaft 3. This is set in rotation in a typical way, for example via a belt pulley of the internal combustion engine of the motor vehicle. Only a section of the driveshaft is shown here. The belt pulley is set on the left end of a driveshaft 3, not shown here, and is connected in a known way with the driveshaft so that they rotate together. The driveshaft extends into a housing 5 of $CO_2$ compressor 1 and drives a conveyor device, which may, for example, be implemented as an axial piston machine, housed in a drive chamber 9, via a flange 7, with which it is connected so that they rotate together. Specifics of the conveyor device are not reproduced here. They are known to those skilled in the art.

During operation of $CO_2$ compressor 1, $CO_2$ is located in drive chamber 9 under a high overpressure. This overpressure acts via borings 11a and 11b, which penetrate flange 7, up to a sealing device 13, which seals drive chamber 9 tightly in relation to the surroundings.

Sealing device 13 has a sliding ring seal, which in this case comprises sliding ring 19, which rotates with driveshaft 3 and has spring resistance applied to it, and a fixed counter ring 21, coupled with a housing part of $CO_2$ compressor 1, as well as a coupling device effecting the coupling between counter ring 21 and the housing part.

Sealing device 13 is assigned a lubrication device 15, which generates a lubricant flow indicated by arrows 17a to 17e.

Sealing device 13 is implemented as a sliding ring seal which includes sliding ring 19, which may be set in motion synchronously with driveshaft 3, and a counter ring 21 fixed with housing 5. Sliding ring 19 and counter ring 21 are pressed against one another by a spring assembly 23. They are in contact with one another in the region of a sliding surface 25 used as a sealing surface, to which rotational axis 27 of the driveshaft is perpendicular. Sliding surface 25 is a ring surface which runs concentrically around driveshaft 3. This sliding surface finally seals drive chamber 9 in relation to the surroundings. It is necessary to press sliding ring 19 with a high force against counter ring 21, because the $CO_2$ molecules are relatively small and therefore may easily overcome sealing surfaces at the high pressure levels occurring during operation of $CO_2$ compressor 1.

Sliding ring 19 is sealed relative to the lateral surface of the driveshaft by means of a suitable seal, in this case by means of an O-ring 29.

In the exemplary embodiment illustrated here, sealing device 13 includes a sleeve 31, also referred to as a cartridge, which surrounds sliding ring 19 and counter ring 21 and which is connected with counter ring 21 so that they rotate together. Counter ring 21 is sealed via a suitable seal, in this case via a second O-ring 33, relative to sleeve 31, which in turn is sealed via a third O-ring 35 relative to housing 5.

Overall, it thus results that drive chamber 9 is sealed in relation to driveshaft 3 via a first O-ring 29 and in relation to the atmosphere via sliding surface 25, which acts as a sealing surface, second O-ring 33, and third O-ring 35.

Lubrication device 15 is implemented in such a way that $CO_2$ with oil flows out of drive chamber 9 onto sliding ring 19 and counter ring 21 and at the same time lubricates sliding surface 25.

Flange 7 supports itself in this case on housing 5 via a first bearing device 37, which, for example, comprises a roller bearing 39. Flange 7 may thus rotate relative to housing 5.

First bearing device 37 lies in the region of the lubricant flow coming out of drive chamber 9.

The lubricant flow will be described in more detail with reference to FIG. 1.

The starting point for the lubricant flow caused by centrifugal forces is a component which may be set in rotation during operation of $CO_2$ compressor 1. In the exemplary embodiment shown in FIG. 1, this is flange 7. This delimits drive chamber 9, in which a suitable compressor unit, for example an axial piston pump, is housed and which is driven via flange 7, which is therefore also referred to as a driver flange. Flange 7 works together with the lubricant present in drive chamber 9, for example an oil, which is centrifuged outward together with the $CO_2$ present in drive chamber 9 during a rotation of flange 7 and forms a liquid quasi-ring on the inner surface which surrounds drive chamber 9. Through the centrifugal forces, the lubricant is centrifuged outward in such a way that an overpressure is built up in the liquid ring. This has the effect that the lubricant—possibly together with the $CO_2$—is guided to sealing device 13.

The lubrication device shown in FIG. 1, which thus comprises the rotating component and/or in this case flange 7, via which the liquid ring is built up, includes at least one channel running from the liquid ring in the direction toward rotational axis 27, for example a boring 12, via which the medium standing under an overpressure is pressed out of the liquid ring in the direction toward sealing device 13. The lubricant flow running into boring 12 is indicated by an arrow 16.

The medium flowing inward inside boring 12 may form two partial flows which are indicated by arrows 17a and 17b. The lubricant flow reaches sleeve 31 in its further course. One partial flow runs into the inside of the sleeve, which is indicated by arrows 17c, 17d, and 17e. This partial flow leads past counter ring 21 and sliding ring 19, with sliding surface 25 particularly being lubricated. Sliding ring 19 and counter ring 21 surround driveshaft 3, as does sleeve 31. The lubricant flow also runs in a ring shape around sliding ring 19 and counter ring 21, so that sealing surface 25 is completely lubricated and also cooled.

The lubricant flow running into the inside of sleeve 31 enters drive chamber 9 through borings 11a and 11b. In this way the loop is closed: the lubricant which has reached this point may now be in turn be centrifuged outward by the rotating component, in this case via flange 7, and reach the liquid ring which presses the lubricant under an overpressure through sleeve 31.

Sleeve 31 presses tightly against flange 7, which rotates relative to sleeve 31. Borings 11a and 11b are positioned at a distance to rotational axis 27 such that they form a fluid connection between sleeve 31, which acts as a housing for the sliding ring seal, and drive chamber 9, and guarantee that a closed lubricant flow arises and a reliable lubrication of sliding surface 25 acting as a seal is ensured.

It may be seen in FIG. 1 that an inlet 41 is provided in sleeve 31 at a distance to flange 7 measured in the axial direction, via which the $CO_2$-oil mixture may enter the inside of sleeve 31. The lubricant flow is guided in such a way that it directly meets sliding surface 25 to be lubricated, as indicated by arrow 17c, and at the same time runs essentially radially from the outside to the inside in the direction toward rotational axis 27. A deflection then occurs so that the lubricant flow runs more or less parallel to central axis 27 through sleeve 31, which arrow 17e shows. It then exits, as mentioned, via borings 11a, 11b into drive chamber 9. With the course of the lubricant flow selected here, which flows along the sliding ring seal, cooling of sealing device 13 may also be ensured.

In the exemplary embodiment shown in FIG. 1, the lubricant flow finally runs, corresponding to arrow 17b, inside boring 12 up to sliding surface 25. Inside boring 12, the flow runs approximately perpendicular to rotational axis 27. It then adjoins a flow region which is indicated by arrow 17b. The lubricant flow runs here from first bearing device 37 to inlet 41 of sleeve 31 at an angle which is approximately 45° in this case. In FIG. 1, a gap 43 is shown which is implemented between housing 5 and flange 7 and within which a part of the lubricant flow may run. This is indicated by arrow 17a. The flow shown here runs essentially radially inward in the direction toward rotational axis 27. Gap 43 has a fluid connection with a ring gap 45 surrounding sleeve 31, in which the partial flow given in gap 43 continues and runs outward around sleeve 31 until it also reaches inlet 41. This partial flow is not absolutely necessary. However, it does contribute to the additional cooling of sleeve 31.

It is indicated by an arrow P that the lubricant flow goes outward from a region radially outside bearing device 37, specifically from the liquid ring described above, and then runs inward to sealing device 13. Finally, the lubricant flow enters drive chamber 9 via borings 11a, 11b through flange 7, which is indicated by arrow P'.

It is obvious without anything further that for the basic principle of the lubricant flow illustrated here, the number of borings 12 is not of direct significance. In order to ensure a uniform flow, approximately four borings are preferably provided, through which the lubricant may pass from the liquid ring inward to sealing device 13.

FIG. 1 shows that in the exemplary embodiment shown here, driveshaft 3 is supported relative to housing 5 via a second bearing device 47. This is positioned at an interval to sealing device 13 outside the $CO_2$ atmosphere, so that in this case an intermediate relief chamber 49 is formed which separates second bearing device 47 and the sealing device. Relief chamber 49 is used so that $CO_2$ and/or $CO_2$-oil mixture emitted from sealing device 13 does not directly meet second bearing device 47, particularly not under high pressure, and affect it. Grease lubrication provided in second bearing device 47 has an elevated service life in this way. This may be increased even more if the relief chamber is connected via a relief channel 51, which penetrates housing 5, with a region standing under a lower pressure, particularly the surroundings, in this case with the atmosphere, so that a pressure build-up in relief chamber 49 which is too great is reliably avoided. The service life of second bearing device 47 may also be increased if it is sealed.

Second bearing device 47 may be positioned near the belt pulley, not shown here, which is connected with driveshaft 3 so that they rotate together, and is preferably placed directly under the belt pulley. In this way, a very small bend of the shaft and/or bend of driveshaft 3 results, so that stress of the shaft seal and/or sealing device 13 is reduced to a minimum. It is particularly avoided that counter ring 21 and sliding ring 19 are tilted relative to one another in the region of sliding surface 25 serving as a sealing surface, which would cause high frictional forces and occurrences of wear.

It is obvious without anything further that a floating mount of driveshaft 3 may be implemented with second bearing device 47, which is indicated here only by a technical symbol, in which all bearing devices of the driveshaft are positioned on one side of housing 5, namely on the side of the belt pulley.

It was already explained above that the sliding ring seal of sealing device 13, which includes sliding ring 19 and counter ring 21, is to prevent the passage of $CO_2$ in the region of sliding surface 25. Therefore, sliding ring 19 and counter ring 21 are pressed against one another with high forces, spring assembly 23 serving for elastic pressures in this case. Due to the high forces acting in sliding surface 25, counter ring 21 must be prevented from racing relative to sleeve 31 and/or housing 5 and/or sliding ring 19 from racing relative to driveshaft 3. O-rings 29, 33, and 35 mentioned are not sufficient in all cases to apply the necessary forces. Therefore, it is advantageous to provide a positive fit between the driveshaft on one hand and/or the fixed housing on the other hand and thus to implement a coupling device.

In FIG. 1, a driver device 53 assigned to the coupling device is provided, which couples sliding ring 19 with driveshaft 3 so that they rotate together. In the exemplary embodiment shown here, the coupling is not provided directly with driveshaft 3 itself, but with flange 7 coupled rigidly with driveshaft 3. For this purpose, driver device 53 has at least one, preferably two, tongues 55a and 55b, of which only tongue 55a is visible here. These engage in a suitable depression provided on flange 7, in this case in one of the borings, specifically in boring 11b, which penetrates flange 7. In this way, driver device 53 is coupled with driveshaft 3 via flange 7 so that they rotate together. The rotational movement is transferred to sliding ring 19 via at least one, preferably two, driver arms 57a, 57b, of which a first driver arm 57a is shown here. This engages in a depression in sliding ring 19, which is implemented here as groove 59.

It is already clear from the illustration shown in FIG. 1 that driver device 53 is producible from a flat material which is elastic per se, preferably from a metal sheet. During the assembly of $CO_2$ compressor 1, particularly during the coupling of driveshaft 3 with flange 7, driver device 53 may come into contact at any desired point with flange 7, since tongue 55a may be pressed back from the positioned shown in FIG. 1 to the left, i.e., in the direction toward sealing device 13. If driveshaft 3 is now rotated relative to flange 7, tongue 55a finally engages in boring 11b and snaps into it, so that it assumes the position illustrated in FIG. 1.

Figure 1A:
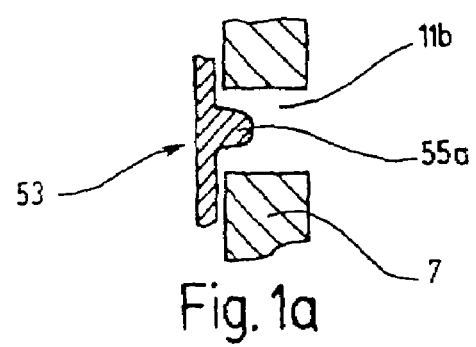
FIG. 1a shows a detail from FIG. 1.

In order to ease the snapping of tongue 55a of driver device 53 into boring 11b, the outer contour of tongue 55a may preferably be shaped as rounded and/or U-shaped. This is visible in the detail illustration in FIG. 1a, which shows tongue 55a illustrated in FIG. 1 in a lateral view, which corresponds to a bottom view of FIG. 1. It is essential that tongue 55a is also otherwise implemented so that it does not pop out of boring 11b unintendedly during transmission of a torque.

The spring effect and/or prestressing force which acts on tongue 55a is provided on one hand by the intrinsic elasticity of driver device 53, but, on the other hand, also by the spring system, implemented here as a spring assembly 23, which is also used for the purpose of pressing sliding ring 19 against counter ring 21, which supports itself on sleeve 31, which in turn presses against a suitable shoulder 61 inside housing 5.

The sliding ring seal is thus elastically clamped by springs between shoulder 61 and flange 7.

To complete the coupling device, counter ring 21 is positioned non-rotatable relative to housing 5. The non-rotatable fixing of counter ring 21 on housing 5 may, as described in more detail below, be performed, on one hand, by a non-rotatable attachment to sleeve 31, which is fixed in housing 5, or, on the other hand, directly to housing 5 itself.

Figure 2:
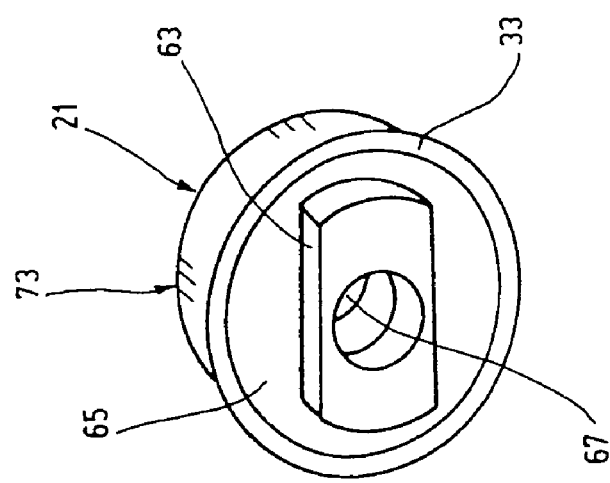
FIG. 2 shows a perspective view of a counter ring of a sliding ring seal.

FIG. 2 shows a preferred embodiment of the non-rotatable coupling between counter ring 21 and sleeve 31. FIG. 2 shows a perspective view of the left side—in FIG. 1—of counter ring 21, i.e., the side which lies opposite sliding surface 25.

In the exemplary embodiment illustrated here, counter ring 21 is provided with a dihedron 63 assigned to the coupling device, whose extent—measured in horizontal direction—is less than the diameter of counter ring 21. The dihedron is flattened on its upper and lower sides. The dihedron projects relative to face 65 of counter ring 21 and engages in an appropriately shaped depression in sleeve 31, which is anchored non-rotatably in a suitable, known way in housing 5.

FIG. 2 merely shows a schematic diagram from which the design of counter ring 21 is visible. Therefore, the dimensions do not correspond with those of FIG. 1.

Counter ring 21 has a central opening 67, through which driveshaft 3 passes. The dimensions of opening 67 are selected so that driveshaft 3, not shown here, is rotatable within counter ring 21. In FIG. 2, second O-ring 33 is also indicated.

Figure 3:
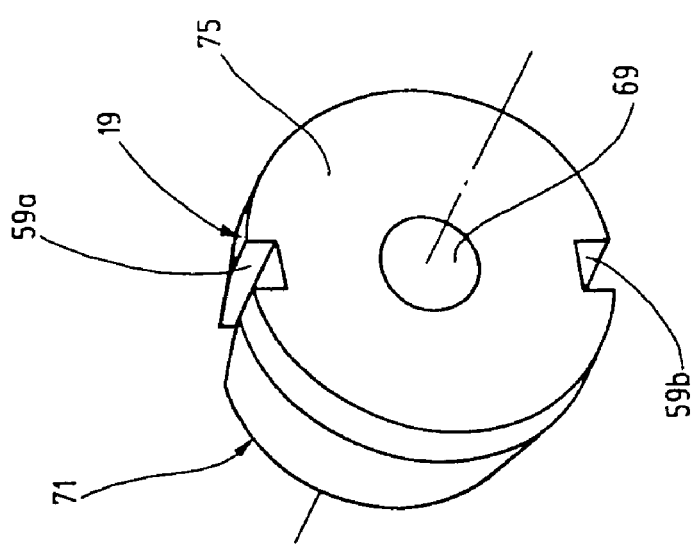
FIG. 3 shows a perspective view of a sliding ring of a sliding ring seal.

FIG. 3 shows the second ring of the sliding ring seal, specifically sliding ring 19, which also has a central opening 69 which is penetrated by driveshaft 3, which, however, is not shown here.

Sliding ring 19 shown here is provided on its outer side with two recesses, implemented here as grooves 59a and 59b, in which driver arms 57a and 57b of driver device 53 engage, which were explained with reference to FIG. 1.

Face 71 of sliding ring 19, on the left in FIG. 3, forms the sliding surface 25, used as the sealing surface with face 73, on the right in FIG. 2, of counter ring 21, which was described in more detail with reference to FIG. 1.

Right face 75 of sliding ring 19 engages with spring assembly 23 described with reference to FIG. 1; it faces flange 7, which was described with reference to FIG. 1. In addition, it points in the direction of driver device 53, as was described in more detail with reference to FIG. 1 and which is shown in perspective in FIG. 4. O-ring 23, mentioned in the explanations for FIG. 1, is not shown here.

Driver device 53 illustrated in FIG. 4 has a main body 77, from which, on one hand, tongues 55a and 55b, described with reference to FIG. 1, project, and, on the other hand, driver arms 57a and 57b project. Main body 77 has a central opening 79, through which driveshaft 3 passes, so that it may be positively connected with flange 7 and a torque is transferable from driveshaft 3 to flange 7.

Figure 4:
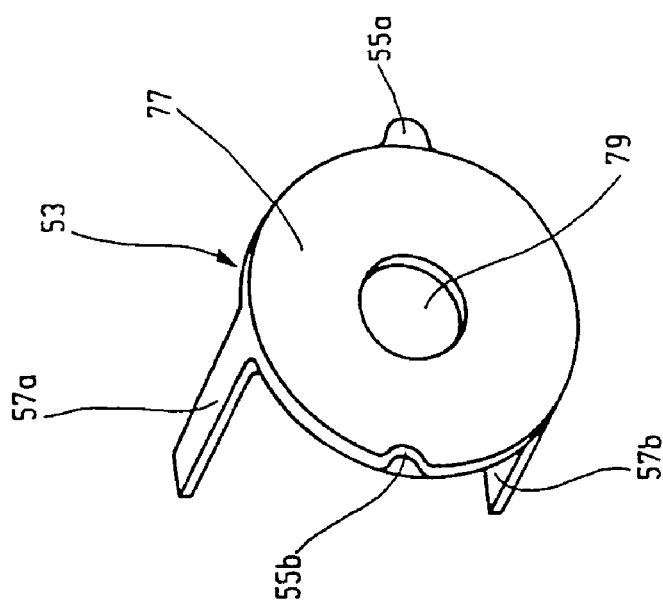
FIG. 4 shows a perspective view of a driver device.

It is obvious from the perspective view shown in FIG. 4 that driver arms 57a, 57b are bent by approximately 90° relative to main body 77, in order to engage in grooves 59a, 59b of adjoining sliding ring 19. On the opposite side of main body 77, tongues 55a, 55b are located, which are to engage in borings 11a, 11b in flange 7.

It may be seen unequivocally in FIG. 4 that driver device 53 is implemented in one piece and is producible from a flat material. In this case, any sufficiently strong material which is also as elastic as possible may be used. Preferably, a metal sheet is used (steel or titanium or the like), which may be formed easily in a stamping-bending method and/or deep drawing method, so that the production costs are relatively low.

It is essential for the main function of driver device 53 that, on one hand, it is engaged with the driveshaft, and/or in this case with flange 7 set in rotation by driveshaft 3, so that they rotate together and, on the other hand, it is coupled with sliding ring 19 so that they rotate together. It is clear that in this case the number of driver arms 57a, 57b and/or tongues 55a, 55b, is not important, nor is their arrangement. In the exemplary embodiment of driver device 53 illustrated in FIG. 4, each two driver arms 57a, 57b and tongues 55a, 55b are positioned lying opposite one another. At the same time, they are positioned on an imaginary diameter line. The diameter lines intersect here at an angle of 90°. In the sectional illustration in FIG. 1, it is presumed only for exemplary purposes that a tongue 11b is also positioned lying opposite a driver arm 57a. An embodiment of this type is, however, also usable without anything further. In this case, tongue 55b would then be positioned opposite driver arm 57b. For the basic function of driver device 53, as mentioned, the arrangement of the driver arms and tongues does not play any significant role.

However, it is decisive that main body 77 of driver device 53 is implemented as elastic per se and therefore exercises a specific prestressing force on tongues 55a, 55b. This may, however, also or additionally be applied by spring assembly 23, so that tongues 55a and 55b have a prestressing force acting in the direction of flange 7 applied to them. Through this prestressing force it is ensured that during assembly, care does not initially have to be taken in the positioning of driver device 53 relative to flange 7 and/or borings 11a, 11b. After flange 7 is placed on the face of driveshaft 3, tongues 55a, 55b, which were initially pressed back by the left side of flange 7, finally catch in borings 11a, 11b and thus produce the coupling between flange 7 and the driver device and/or sliding ring 19 so that they rotate together. In this way, assembly is significantly simplified.

Finally, it is clear that the two rings of the sliding ring seal are coupled by means of the coupling device with, on one hand, housing 5 or with, on the other hand, driveshaft 3, respectively, so that they rotate together, counter ring 21 being coupled via dihedron 63 and via sleeve 31 with housing 5 and sliding ring 19 being connected via driver device 53 with flange 7, which is coupled with driveshaft 3 so that they rotate together, so that slipping is prevented. During relative rotation of driveshaft 3 in relation to housing 5, displacement of the rings of the sliding ring seal relative to housing 5 or relative to driveshaft 3, respectively, is prevented, so that associated O-rings 23, 33, and 35 are therefore not subject to wear. Relative rotation occurs exclusively in the region of sliding surface 25, which is protected by the lubricant flow against too great a wear. Furthermore, second bearing device 47 ensures that sliding surface 25 is essentially perpendicular on rotational axis 27 and right face 73 of counter ring 21 runs parallel to left face 71 of sliding ring 19. In this way, on one hand, an optimal seal of drive chamber 9 or the lubricant flow, respectively, relative to the surroundings or relief chamber 49, respectively, is guaranteed, and, on the other hand, the wear is reduced to a minimum.

All of the exemplary embodiments shown in FIGS. 1 to 4 share the feature that the lubricant flow runs inward, viewed outward from the sliding surface 25, and is generated by a rotating component, in this case flange 7, acting as a centrifugal force pump. This centrifuges the $CO_2$-lubricant mixture present in drive chamber 9 outward due to centrifugal forces and possibly also due to swirls in such a way that a liquid ring is built up, within which an overpressure is built up. This depends on, among other things, the speed of the component and its design, as well as on the temperature and viscosity of the lubricant. The overpressure may be, for example, 3 mbar to approximately 200 mbar, preferably 10 mbar to 50 mbar.

The lubricant flow is used, on one hand, for the purpose of ensuring lubrication in the region of sliding surface 25, and, on the other hand, for the purpose of cooling this region of sealing device 13 and/or the sliding ring seal. In this case, it may be established that with increasing speed of $CO_2$ compressor 1, on one hand, the heat build-up in the region of sliding surface 25 increases, but, on the other hand, the strength of the lubricant flow and therefore the cooling also increase.

An essential advantage of $CO_2$ compressor 1 illustrated here is that the lubricant flow is generated by centrifugal force and swirls of the flange and is guided back into the drive chamber center having "lower" pressure through suitable borings 12, 15, 43, 45, 11a, and not, as in known devices, solely by gravity. In the known devices, it was of decisive significance to bring the $CO_2$ compressor into a specific assembly position, in order to ensure a sufficient lubrication and cooling. In $CO_2$ compressor 1 described here, it is possible to position it in any desired assembly position, since the lubricant flow, and therefore also the lubrication and cooling, may be ensured in any case.

The invention claimed is:

1. A $CO_2$ compressor for an air conditioner of a motor vehicle having a sealing device, assigned to a driveshaft of the $CO_2$ compressor, which is implemented as a sliding ring, comprising:
a lubrication device structured to supply the sealing device with a lubricant flow effected by centrifugal forces, the sealing device including a sleeve enclosing a bearing seal ring having the sliding ring which rotates with the driveshaft and a driver device engaged with the sliding ring as part of a coupling device to couple the sliding ring with the driveshaft for rotation with the drvieshaft, the driver device comprising at least one axially-extending driver arm which engages in a depression formed in the sliding ring and at least one axially-extending tongue and a spring device which applies a prestressing force to the at least one tongue of the driver device, the lubrication device comprising a ring gap formed about said sleeve and being in fluid communication with the bearing ring seal and sliding ring via a sleeve inlet.

2. The $CO_2$ compressor according to claim 1, wherein a component acting together with the lubricant, which is rotatable during operation of the $CO_2$ compressor, forms a centrifugal force pump to generate the lubricant flow.

3. The $CO_2$ compressor according to claim 2, wherein the component is a flange provided inside the $CO_2$ compressor.

4. The $CO_2$ compressor according to claim 1, wherein the driver device is coupled with a component driven by the driveshaft of the $CO_2$ compressor so that said driver device and component driven by the driveshaft rotate together.

5. The $CO_2$ compressor according to claim 4, wherein the driver device is coupled to a flange so that the flange and the driver device rotate together.

6. The $CO_2$ compressor according to claim 5, wherein the driver device is formed from a single piece of material.

7. The $CO_2$ compressor according to claim 1, wherein the driver device is formed from a flat material.

8. The $CO_2$ compressor according to claim 7, wherein the driver device is formed from sheet metal.

9. A method for forming a $CO_2$ compressor as set forth in claim 1, the method comprising forming the driver device in a stamping-bending method.

10. The method according to claim 9, wherein the driver device is formed by a deep drawing method.

11. The $CO_2$ compressor according to claim 1, wherein the driver device is formed from a single piece of material.

12. The $CO_2$ compressor according to claim 1, wherein the $CO_2$ compressor has a housing and wherein the sealing device has a fixed counter ring coupled to part of the housing of the $CO_2$ compressor and a coupling device effecting the coupling.

13. The $CO_2$ compressor according to claim 12, wherein the coupling device includes a dihedron.

14. The $CO_2$ compressor according to claim 1, further comprising a second bearing device, assigned to the driveshaft, which has a bearing positioned outside the $CO_2$ atmosphere.

15. The $CO_2$ compressor according to claim 14, wherein the bearing of said second bearing device is sealed and/or lubricated with grease.

16. The $CO_2$ compressor according to claim 14, further comprising a relief chamber disposed between the second bearing device and the sealing device.

17. The $CO_2$ compressor according to claim 16, wherein the relief chamber has a relief channel which produces a connection between the relief chamber and the atmosphere.

18. The $CO_2$ compressor of claim 1 wherein the lubrication device further comprises a radially-extending gap positioned perpendicular to the sealing device to direct lubricant to the bearing seal ring and sliding ring.

19. The $CO_2$ compressor of claim 18 further comprising a flange rotatably driven by the driver device, and wherein the radially-extending gap is positioned between the flange and a casing of the compressor.

20. The $CO_2$ compressor of claim 1 wherein the lubrication device further comprises a bore formed through a casing of the compressor, said bore being positioned at a 45° angle to the sleeve.

21. The $CO_2$ compressor of claim 20 further comprising a radially-extending gap positioned perpendicular to the sleeve to direct lubricant to the bearing seal ring and sliding ring under centrifugal force.

22. A $CO_2$ compressor for an air conditioner of a motor vehicle comprising:
a driveshaft;
a sealing device disposed about the driveshaft so as to form a sliding ring, the sealing device comprising;
a sleeve disposed about said sliding ring;
a lubrication device providing a ring gap disposed about said sleeve and being in fluid communication with said sliding ring to provide a lubricant flow to said sliding ring effected by centrifugal forces, said ring gap further providing a cooling effect to said sleeve;
a bearing seal ring having the sliding ring which rotates with the driveshaft; and
a driver device engaged with the sliding ring as part of a coupling device to couple the sliding ring to the driveshaft for rotation with the driveshaft, the driver device comprising at least one axially-extending driver arm which engages a depression in the sliding ring and at least one axially-extending tongue subject to a prestressing force.

23. The $CO_2$ compressor according to claim 22 further comprising a spring device for applying the prestressing force to the at least one tongue of the driver device.

24. The $CO_2$ compressor according to claim 22, further comprising a flange which acts together with a lubricant supplied by the lubrication device, the lubrication device being rotatable during operation of the $CO_2$ compressor to form a centrifugal force pump to generate the lubricant flow.

25. The $CO_2$ compressor according to claim 22, wherein the driver device is coupled with a component driven by the driveshaft of the $CO_2$ compressor so that the component and driver device rotate together.

26. A method for forming a $CO_2$ compressor having a driveshaft, and a sealing device, the method comprising:
  selecting the sealing device having a rotatable sliding ring and a driver device with at least one axially-extending tongue subject to a prestressing force provided by disposing a spring in the sealing device between the sliding ring and driver device to apply the prestressing force to the at least one tongue, said driver device having at least one drive arm axially-extending in a direction away from said at least one axially-extending tongue and engaged with a depression formed in said rotatable sliding ring to impart rotation to said rotatable sliding ring;
  providing a housing for said sealing device; and
  providing a lubrication device having a ring gap positioned about a sleeve that is disposed about said rotatable sliding ring, the ring gap supplying lubricant to the rotatable sliding ring and forming a lubricant flow by centrifugal force.

27. The method according to claim 26, further comprising disposing said sliding ring so that the sliding ring rotates with the driveshaft.

* * * * *